J. M. MEYERS.
SELF CLEANING TRACTOR DRIVING WHEEL.
APPLICATION FILED OCT. 25, 1919.
1,434,354. Patented Oct. 31, 1922.
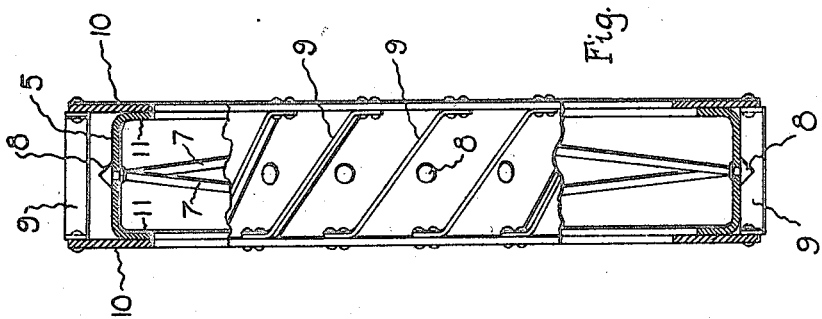
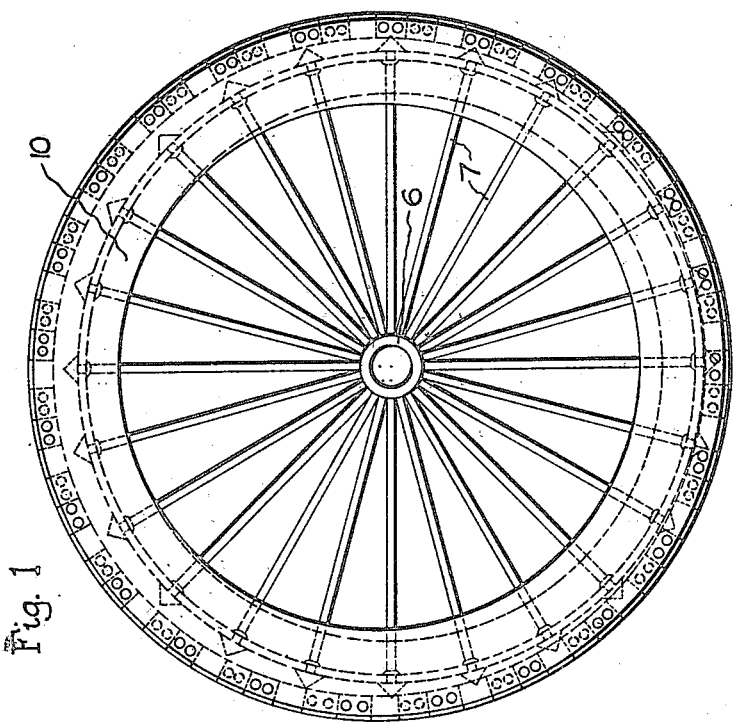
Inventor
JOHN M. MEYERS
By Attorneys Patented Oct. 31, 1922.

1,434,354

UNITED STATES PATENT OFFICE.

JOHN M. MEYERS, OF JANESVILLE, WISCONSIN, ASSIGNOR TO GENERAL MOTORS CORPORATION, OF DETROIT, MICHIGAN, A CORPORATION OF DELAWARE.

SELF-CLEANING TRACTOR DRIVING WHEEL.

Application filed October 25, 1919. Serial No. 333,225.

*To all whom it may concern:*

Be it known that I, JOHN M. MEYERS, a citizen of the United States, and a resident of Janesville, county of Rock, and State of Wisconsin, have invented certain new and useful Improvements in Self-Cleaning Tractor Driving Wheels, of which the following is a full, clear, concise, and exact description, such as will enable others skilled in the art to which the invention relates to make and use the same, reference being made therein to the accompanying drawing, which forms a part of this specification.

My invention relates to metallic wheels, and particularly to wheels designed for use as the driving wheels of tractors and similar self-propelled vehicles.

Heretofore the driving wheels of tractors, which are commonly and indeed in practically all cases necessarily provided with cleats for preventing the wheel from slipping, have had a very persistent tendency to pick up dirt from a surface over which they are travelling; and have become clogged to such an extent as to neutralize the beneficent effects designed to be produced by the use of cleats upon the periphery of the wheel after an extremely short period of use. Prior tractor driving wheels have, therefore, and because of the clogging of the cleats, been unsatisfactory; as their driving action decreases rapidly in use, because of the fact that the driving action of the cleats becomes neutralized by the partial or even complete filling up of the spaces between the cleats, or about the same, by dirt taken up by the wheel; this objectionable result being particularly likely to occur when the tractor is operating over wet or clayey ground.

The object of my invention is to provide an improved tractor driving wheel which will be self-cleaning; that is, in which such dirt as may be taken up by the wheel and adheres to the periphery thereof will be discharged from the wheel as the same rotates, thus providing a driving wheel in which clogging of the cleats is prevented.

My improved tractor driving wheel is illustrated in its preferred form in the drawing acompanying and forming a part of the specification; although it will be appreciated that the same may be modified in various particulars without departing from the spirit of my invention, and that my invention includes all such variations and modifications of the particular form thereof illustrated as come within the scope of the concluding claims.

In the drawing wherein the preferred embodiment of my invention is illustrated:

Figure 1 is a view showing my improved tractor wheel in side elevation.

Figure 2 is a view showing the same partly in section upon a vertical central plane, and partly in end elevation.

Referring to the drawing, the reference numeral 5 designates the rim or felly of a metallic driving wheel, the same being preferably channel shaped in cross-section although the particular form of rim is immaterial, so far as concerns the invention to which this present application relates. The rim 5 is supported from the hub 6 of the wheel by spokes 7 in the embodiment of my invention illustrated, although equivalent supporting means may be provided intermediate the hub of the wheel and the rim thereof.

The wheel proper constituted as above described may in fact be of any of the forms at present in use for wheel structures. The periphery of the wheel, however, is provided with projections 8 which, in the form of my invention illustrated, are provided by the ends of the spokes 7 which are provided with heads upon the outer surface of the rim to thus both secure the ends of the spokes in place relative to the rim and to provide projections upon the outer surface of the said rim. The projections, however, may be otherwise provided, that is they are not necessarily formed by upset or riveted over ends of the spokes.

The reference numerals 9 designate a series of cleats arranged in a circle, and which cleats are carried by a suitable annular supporting member preferably made up of two annular members or plates 10, 10 extending inwardly from the outer limits of the cleats, and which plates are in sliding contact with inwardly extending side flanges of the rim 5 in the embodiment of my invention illustrated. The diameter of the circle which contacts with the inner edges of the cleats is greater than the external diameter of the rim 5, so that the rim lies within the space enclosed by the cleats and annular side plates, and from which it follows that the structure made up of the annular members and the cleats is movable bodily in a plane or in planes perpendicular to the axis of rotation of the wheel proper made up of the hub 6, the rim 5 and the spokes or equivalent connecting members.

The cleats 9 extend across the periphery of the wheel proper, and the cleats upon the under side thereof contact with the ground engaging surface of the rim when the wheel is in use; because of the fact that the entire cleat structure, including the annular supporting members 10 for the cleats, is pushed upward by the engagement with the ground, such movement taking place because of the freedom of movements of the cleat structure relative to the wheel proper permitted by the features of construction above enumerated.

The cleats 9 at the bottom of the wheel are engaged by the projections 8 provided upon the periphery of the rim 5 by the ends of the spokes 7, or otherwise, thus preventing circumferential movement of the cleats and the supporting means whereby they are carried relative to the wheel proper; and such engagement in effect locks the cleats to the rim of the wheel proper, and causes them to perform the ordinary function of cleats in preventing slipping between the wheel and the ground upon which it is operating. The cleats are preferably aranged at an angle relative to the annular members 10, 10 to which their ends are secured, although they may obviously extend straight across the rim should such an arangement be deemed preferable.

When the wheel is in use the layer of dirt which under ordinary or at least not unusual conditions adheres to the periphery of the rim 5 and becomes more or less firmly wedged in between the cleats, the rim 5, and the side plates 10 or equivalent supports for the cleats, will be disengaged from the rim and pulled away therefrom and broken up as the cleats and annular supports therefor recede from the periphery of the rim due to the rotation of the wheel. The dirt in question will in practically all cases fall away from the wheel very soon after the cleats begin to rise; it will be appreciated, however, that movement of the cleats away from the rim occurs throughout half a rotation of the wheel, and movement toward the rim throughout the next half a rotation, so that the adherent layer of dirt will with certainty, at least under substantially all conditions of operation, be completely broken up and detached from the wheel before the cleats again reach the under side thereof and are about to engage the ground at the beginning of a second rotation of the wheel.

Having thus described and explained my invention I claim and desire to secure by Letters Patent:

1. In a driving wheel for tractors, a wheel proper comprising a peripheral rim or felly, and spokes for supporting said rim from a suitable hub; two annular members spaced apart from one another and movable independently of said rim; a plurality of cleats carried by said annular members and adapted to move toward and from the periphery of said rim; and means for preventing said annular members and cleats from rotary movement independently of the rim when the wheel is in use.

2. In a driving wheel for tractors, a wheel proper comprising a rim or felly, and spokes for supporting said rim from a central hub; two annular members disposed one upon each side of said rim and which members are in sliding engagement with the sides thereof; a plurality of cleats extending between said annular members and across the ground engaging face of said rim, the distance between oppositely located cleats being greater than the diameter of said rim; and projections upon the said rim and with which said cleats engage, to thereby prevent movement of said annular members and cleats circumferentially and independently of said rim.

3. In a driving wheel for tractors, a plurality of cleats spaced apart from one another; an annular member whereby said cleats are carried; a wheel proper lying within the space enclosed by said cleats and the diameter of which is less than the diameter of the circle along which said cleats are spaced; means for securing said annular member and wheel together in such a way as to permit movement of said member bodily in a direction perpendicular to the axis of rotation of the wheel; and means for preventing circumferential movement of said cleat carrying member relative to said rim.

4. In a driving wheel for tractors, a plurality of cleats spaced apart from one another; an annular member whereby said cleats are carried; a wheel proper lying within the space enclosed by said cleats and the diameter of which is less than the diameter of the circle along which said cleats are spaced; means for securing said annular member and wheel together in such a way as to permit movement of said member bodily in a direction perpendicular to the axis of rotation of the wheel; and a plurality of projections upon the peripheral ground engaging surface of said rim and with which said cleats engage to thereby prevent circumferential movement of said cleat carrying member independently of said rim.

5. In a driving wheel for tractors, a wheel proper comprising a rim or felly, and spokes for supporting said rim from a central hub; two annular members disposed one upon each side of said rim and which members are in sliding engagement with the sides thereof; a plurality of cleats extending between said annular members and across the ground engaging face of said rim, the distance between oppositely located cleats being greater than the diameter of said rim; and projections formed by the outer ends of the spokes aforesaid for preventing movement of said annular members and cleats circumferentially and independently of said rim.

In testimony whereof I affix my signature.

JOHN M. MEYERS.